Aug. 6, 1968 J. PIRET 3,395,931
HYDRO-PNEUMATIC SUSPENSION DEVICES, PARTICULARLY
FOR AUTOMOBILE VEHICLES
Filed Sept. 3, 1965 4 Sheets-Sheet 1
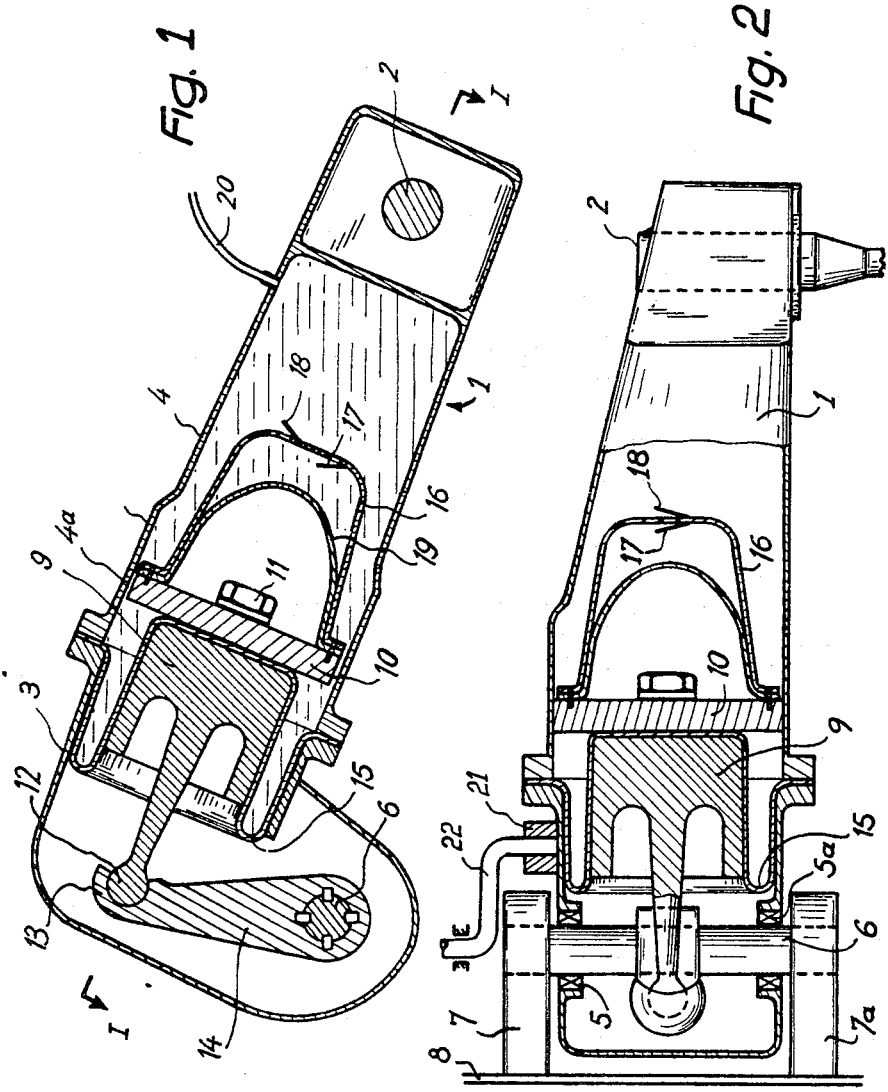
Inventor
Jean Piret
Stevens, Davis, Miller & Mosher
Attorneys

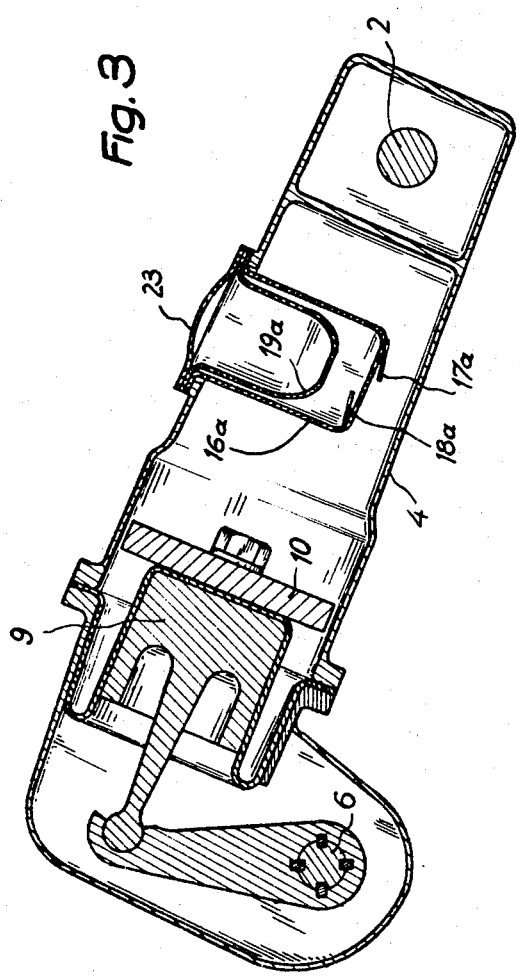

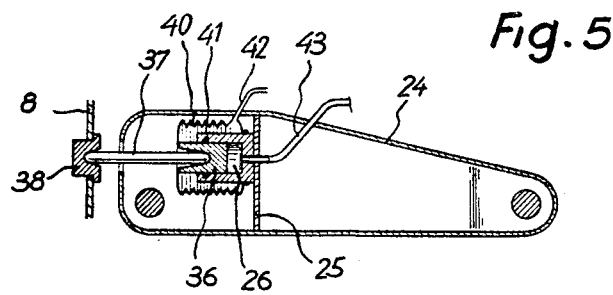
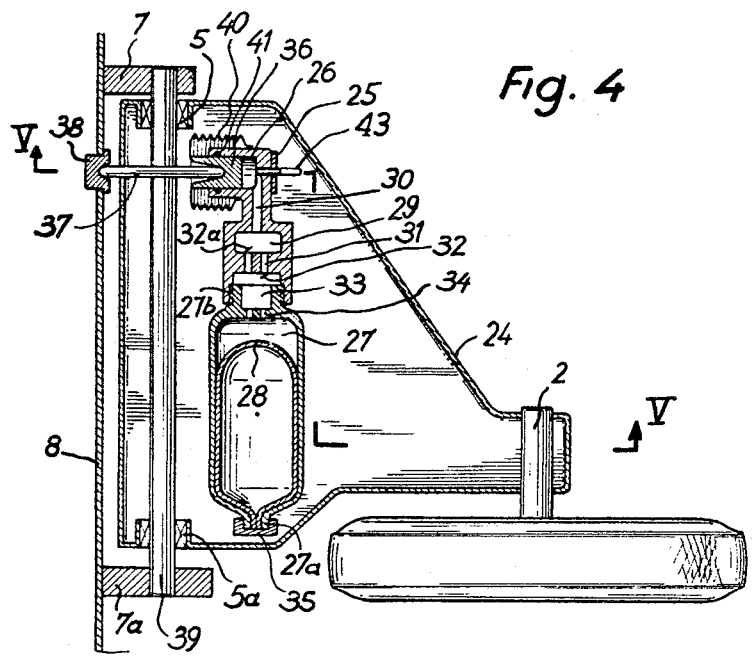

United States Patent Office 3,395,931
Patented Aug. 6, 1968

3,395,931
HYDRO-PNEUMATIC SUSPENSION DEVICES PARTICULARLY FOR AUTOMOBILE VEHICLES
Jean Piret, Vernouillet, France, assignor to Société anonyme: Simca Automobiles, Paris, France
Filed Sept. 3, 1965, Ser. No. 484,994
Claims priority, application France, Sept. 8, 1964, 987,384; Aug. 6, 1965, 27,603
18 Claims. (Cl. 280—124)

ABSTRACT OF THE DISCLOSURE

A hydro-pneumatic suspension device for an automobile vehicle having a hollow, wheel supporting arm, one end of which is pivoted on a pivot axle fixed to the vehicle and the other end of which has a wheel axle mounted thereon. The hollow arm includes internally a piston connected to the vehicle and movable in a rigid enclosure filled with liquid in fluid communication with a deformable enclosure filled with a constant mass of fluid. Movement of the arm causes movement of the piston and subjects the deformable enclosure to the pressure variations produced by the movement of the piston.

---

The invention relates to a hydro-pneumatic suspension device, particularly for automobile vehicles.

Numerous hydro-pneumatic suspension devices are constituted by a piston fixed to an arm supporting each of the wheels, said piston sliding in a cylinder filled with oil which acts on a predetermined volume of gas disposed in a hermetically sealed chamber comprising a flexible diaphragm which separates the oil from the gas. The gas contained in the hermetic chamber enables the different shocks, which would normally be received by the vehicle body by reason of sudden changes in the level of the roadway, to be absorbed.

Devices of this type are mounted between the arm supporting the wheels and the body of the vehicle. The result of this is a certain bulkiness which reduces the useful body space of the vehicle.

The object of the present invention is to provide a new suspension device of the type mentioned, which, by serving also as an arm for the wheel, considerably reduces the bulkiness compared with known devices, since the external connection which existed between the arm of the wheel and the vehicle body is no longer necessary.

The present invention consists in a hydropneumatic suspension device for a wheeled vehicle, comprising a wheel supporting arm which at one end is pivoted on a pivot axle fixed to the vehicle and at its other end carries a wheel axle, said arm including a piston movable in a rigid enclosure filled with liquid and a deformable enclosure filled with a constant mass of gas, the external surface of said deformable closure being exposed to pressure variations in said liquid produced by the movement of said piston in said rigid enclosure, and means connecting said piston to the vehicle whereby to move said piston in said rigid enclosure as the arm pivots about said pivot axle.

According to a feature of the invention, the wheel supporting arm is pivoted about an axle which is fixed to the chassis and extends transversely to the direction of movement of the vehicle, said arm being formed as a casing internally comprising two rigid enclosures filled with liquid and communicating together through openings provided with valves, one of the rigid enclosures being slidable on a piston which is positioned by a member fixed to the vehicle, the other rigid enclosure surrounding a deformable enclosure filled with a constant mass of gas.

In order that the invention may be more clearly understood, various embodiments thereof will now be described with reference to the accompanying drawings, in which:

FIGURE 1 is a side sectional view of the suspension device,

FIGURE 2 is a plan view, partly in section along the line II—II of FIGURE 1,

FIGURE 3 is a side sectional view of a modification of the device of FIGURE 1,

FIGURE 4 is a plan view of another embodiment of the suspension device,

FIGURE 5 is a section along the line V—V of FIGURE 4,

Figure 7:
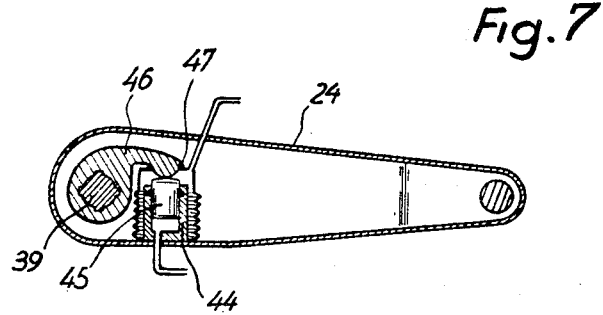
FIGURE 7 is a section along the line VII—VII of FIGURE 6.

Referring to FIGURES 1 and 2, reference 1 indicates the arm supporting the wheel axle 2.

The arm 1 is constituted by two casing portions 3 and 4 which are connected together by any suitable means (not shown) and are capable of pivoting on ball bearings 5, 5a, about an axle 6 fixed by means of supports 7, 7a, to the chassis 8 of the vehicle and parallel to the wheel axle 2.

A piston 9, the head of which is constituted by a cylindrical piece 10 fixed to the piston by a bolt 11 and the end 12 of which is lodged in a ball-and-socket joint portion of a member 14 fixed to the axle 6, slides axially in the part 4a of the casing 4.

The casings 3 and 4 are separated by a high resistance diaphragm 15 which may be made of synthetic rubber, for example. This diaphragm 15 is interposed between the piston 9 and the head 10 and forms a sealing joint between the casings 3 and 4.

On the head 10 of the piston is fixed, by means not shown, a rigid enclosure 16 provided with holes 17 having valves 18. The enclosure 16 contains a deformable enclosure 19 which is filled with a constant mass of gas, nitrogen in particular, and of which the edge may also serve as a joining between the head 10 of the piston and the rigid enclosure 16.

The chamber constituted by the casing 4 is filled with hydraulic liquid and is connected to a position correcting device by a conduit 20.

Finally, the casing 3 receives, in the fixing member 21, an anti-rolling bar 22, which connects with the supporting arm of another wheel of the vehicle.

In operation, shocks due to sudden changes in road level are absorbed by means of the deformable gas-filled enclosure 19 in the following manner.

Assuming that in the course of a sudden change in level, the axle 2 supporting the wheel rises. The arm 1 constituted by the contiguous casings 3 and 4 turns about the axle 6.

Since the member 14 is fixed, the piston 9 swings about the center of the ball-and-socket joint 13. The result is that the distance between the head end of the piston 9 and the axle 2 changes. Thus, with the assumed movement, when the axle 2 rises, the part 4a of the casing 4 slides along the head 10 of the piston 9 and the liquid contained in the casing 4 passes into the rigid enclosure 16 through the holes 17 and compresses the gas-filled enclosure 19.

It will be clear that numerous modifications may be made in the device which has just been described. Thus, instead of fixing the rigid enclosure 16 surrounding the deformable enclosure 19 to the head 10 of the piston 9, it may be fixed to the casing 4 as shown in FIGURE 3. In this modification the rigid enclosure 16a is directly fixed to the casing 4 as well as the flexible diaphragm 19a which is held fixed to the casing 4 by means of the plate 23.

It will be seen that when the axle 2 swings about the axle 6, the part 4a of the casing slides over the head 10 as previously. In this action, the piston 9 compresses the liquid contained in the casing 4, so that the liquid passes into the rigid enclosure 16a through the holes 17a with the valves 18a, thus compressing the flexible diaphragm 19a. The principal advantage of this modification is that it facilitates filling the gas chamber as well as mounting and dismounting the device.

In another embodiment shown in FIGURES 4 and 5, the arm 24 for supporting the wheel does not itself constitute one of the rigid enclosures of the suspension assembly as in the devices shown in FIGURES 1, 2 and 3, but is fixed by a support 25 (FIGURE 5) with the suspension assembly. This suspension assembly comprises a cylindrical chamber 26, equivalent to the chamber formed by the casing 4 of the devices of FIGURES 2 and 3, a rigid enclosure 27 containing a deformable enclosure 28 filled with a constant mass of gas and equivalent to the rigid enclosure 16 or 16a and its deformable enclosure 19 or 19a in FIGURES 2 and 3. Between the chamber 26 and the rigid enclosure of 27 are disposed two supplementary chambers 29 and 33. Chamber 29 communicates with the chamber 26 through a channel 30, and, through channels 31 having valves 32, 32a, with the chamber 33, which latter itself communicates with the chamber 27 through channels 34. The flexible enclosure 28 is fixed to the rigid enclosure 27 by a tightening member 35 which is screwed onto the end 27a of the enclosure 27. Moreover, the rigid enclosure 27 is screwed by its threaded end 27b to the inside of the chamber 33.

A piston 36 slides in the chamber 26, said piston being supported against the chassis 8 by means of an arm 37 which bears at one end against the piston and at its other end against a thrust block 38 positioned in a hole in the chassis 8.

The arm 24 supporting the wheel is a casing in the form of a horizontal right-angle triangle which is capable of pivoting about an axle 39 equivalent to the axle 6 of the previous embodiments.

In addition, a bellows 40 joins the piston 36 to the chamber 26 and a sealing joint 41 is interposed between the piston 36 and the wall of the chamber 26, in order to obtain a complete sealing of the suspension assembly and avoiding any leakage and dripping of hydraulic liquid. Any leakage which may occur is collected by the bellows 40, and a drain 42 returns the hydraulic liquid to the position correcting circuit to which the chamber 26 is connected by means of a pipe system 43.

The operation of this device is the same as that of the previously described devices. The rotation of the arm 24 about the axle 39 produces a relative movement of the piston 36 with respect to the chamber 26, which drives the hydraulic liquid from this chamber 26 and compresses the flexible enclosure 28.

The advantage of this embodiment is that the thickness of the wheel-supporting arm is reduced by generally arranging the suspension assembly horizontally and transversely to the longitudinal axis of the vehicle. By means of this arrangement, operation may also be effected under greater pressures and consequently use may be made of a less bulky and less heavy compression cylinder. Moreover, the rigid enclosure 27 is demountable.

Figure 6:
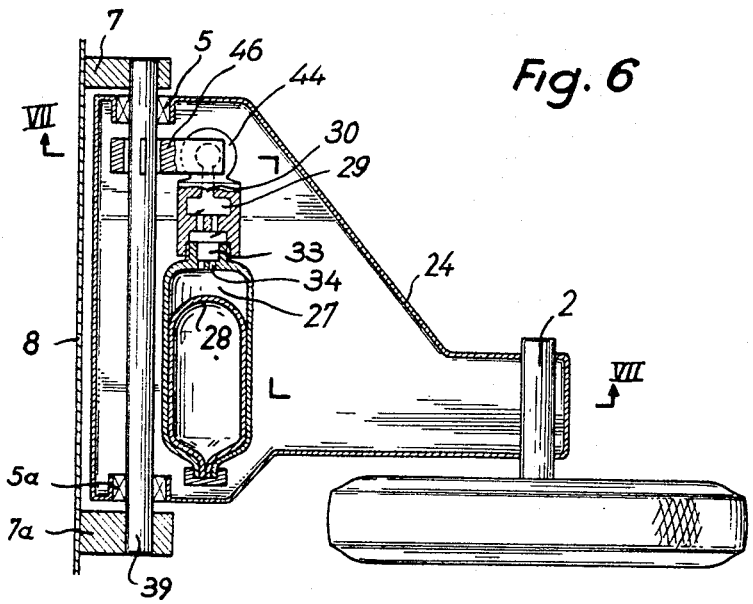
FIGURE 6 is a modification of the device of FIGURE 4.

Finally, in another embodiment shown in FIGURES 6 and 7, the suspension device is the same as that of FIGURES 4 and 5 except that the cylindrical chamber 44 is no longer parallel to the plane of the casing 24 but is arranged vertically and slides on a piston 45 moved by an arm 46 fixed to the axle 39. Moreover, the bellows 40 is connected to the arm 46 with the interposition of a sealing joint 47. Thus the rotation of the casing 24 about the axle 39 produces relative movement of the piston 45 in the chamber 44, the piston 45 remaining substantially immobile so that its mass does not participate in the movements of the casing 24, which reduces the inertia of the suspension arm.

Of course, the invention is not limited to the embodiments described and shown, but includes modifications and variations thereof.

I claim:

1. In a wheeled vehicle, a hydro-pneumatic suspension device comprising a wheel axle, a pivot axle fixed to the vehicle and disposed transversely to the direction of movement of the vehicle, a hollow wheel supporting arm one end of which is pivoted on said pivot axle and the other end of said arm carrying said wheel axle, said hollow arm including a casing, first and second rigid enclosures in said casing each filled with liquid, valved openings providing communication between said enclosures, a piston movably mounted in said first rigid enclosure, a member fixed to said vehicle and carrying said piston, a deformable enclosure filled with a constant mass of fluid and mounted within said second rigid enclosure, the external surface of said deformable enclosure being exposed to pressure variations in said liquid produced by the movement of said piston in said first rigid enclosure, means connecting said piston to the vehicle to move said piston in said first rigid enclosure as the hollow arm pivots about said pivot axle.

2. A device according to claim 1, wherein said second rigid enclosure containing the deformable enclosure is fixed to and movable with the piston.

3. A device according to claim 2 wherein the deformable enclosure comprises a cup-shaped flexible diaphragm having its free edge fixed between a head portion of the piston and the edge of said second rigid enclosure.

4. A device according to claim 1, further comprising a flexible sealing diaphragm fixed to the piston and dividing said casing into two portions.

5. A device according to claim 4, wherein said piston has a head portion constituted by a cylindrical piece fixed to the piston and holding the flexible sealing diaphragm in sealing relation with the piston.

6. A device according to claim 4, wherein said second rigid enclosure is removably secured to a wall of that portion of the casing constituting said first rigid enclosure.

7. A device according to claim 1, further comprising an arm fixed to said axle, a piston rod integral with said piston, said piston rod being connected to said arm by a ball-and-socket joint.

8. A device according to claim 1, wherein the supporting arm casing is shaped to be generally triangular in the horizontal plane and within which the hydro-pneumatic suspension assembly comprising said first and second rigid enclosures is located with the axis of the assembly extending parallel to the pivot axle of the supporting arm.

9. A device according to claim 8, wherein said first rigid enclosure comprises a cylindrical chamber fixed to the casing with the axis of the cylindrical chamber disposed vertically.

10. A device according to claim 9, further comprising an arm having one end fixed to the pivot axle of the supporting arm, said piston being mounted on the other end of said arm.

11. A device according to claim 10, in which said second rigid enclosure comprises a container detachably mounted on the supporting arm, two valved auxiliary chambers interconnected by channels providing communication between said container and said first rigid enclosure.

12. A device according to claim 11, wherein the deformable enclosure is detachably disposed in said second rigid enclosure.

13. A device according to claim 8, wherein said first rigid enclosure comprises a cylindrical chamber fixed to the supporting arm casing with the axis of the cylindrical chamber disposed horizontally and perpendicularly to the pivot axle of the supporting arm.

14. A device according to claim 13, further comprising a thrust block fixed on the vehicle, a thrust member extending between the piston and said thrust block to position the former.

15. A device according to claim 8, further comprising a bellows enclosing the piston relative to said first rigid enclosure.

16. A device according to claim 15, further comprising a hydraulic fluid supply, a drain connecting the bellows to said hydraulic fluid supply.

17. A device according to claim 1, further comprising a liquid supplying means, a conduit connecting the rigid enclosure to said liquid supply means for supplying liquid thereto.

18. A device according to claim 1, further comprising an anti-rolling bar connecting two wheel supporting arms.

References Cited

UNITED STATES PATENTS

| | | |
|---|---|---|
| 2,942,873 | 6/1960 | Wordsworth. |
| 2,973,195 | 2/1961 | Armstrong. |
| 3,204,980 | 9/1965 | Guerriero _____ 280—96.2 X |
| 3,085,817 | 4/1963 | Krause _____ 280—124.3 |

FOREIGN PATENTS

| | | |
|---|---|---|
| 1,082,810 | 6/1960 | Germany. |
| 1,261,121 | 4/1961 | France. |

PHILIP GOODMAN, *Primary Examiner.*